United States Patent Office 3,384,163
Patented May 21, 1968

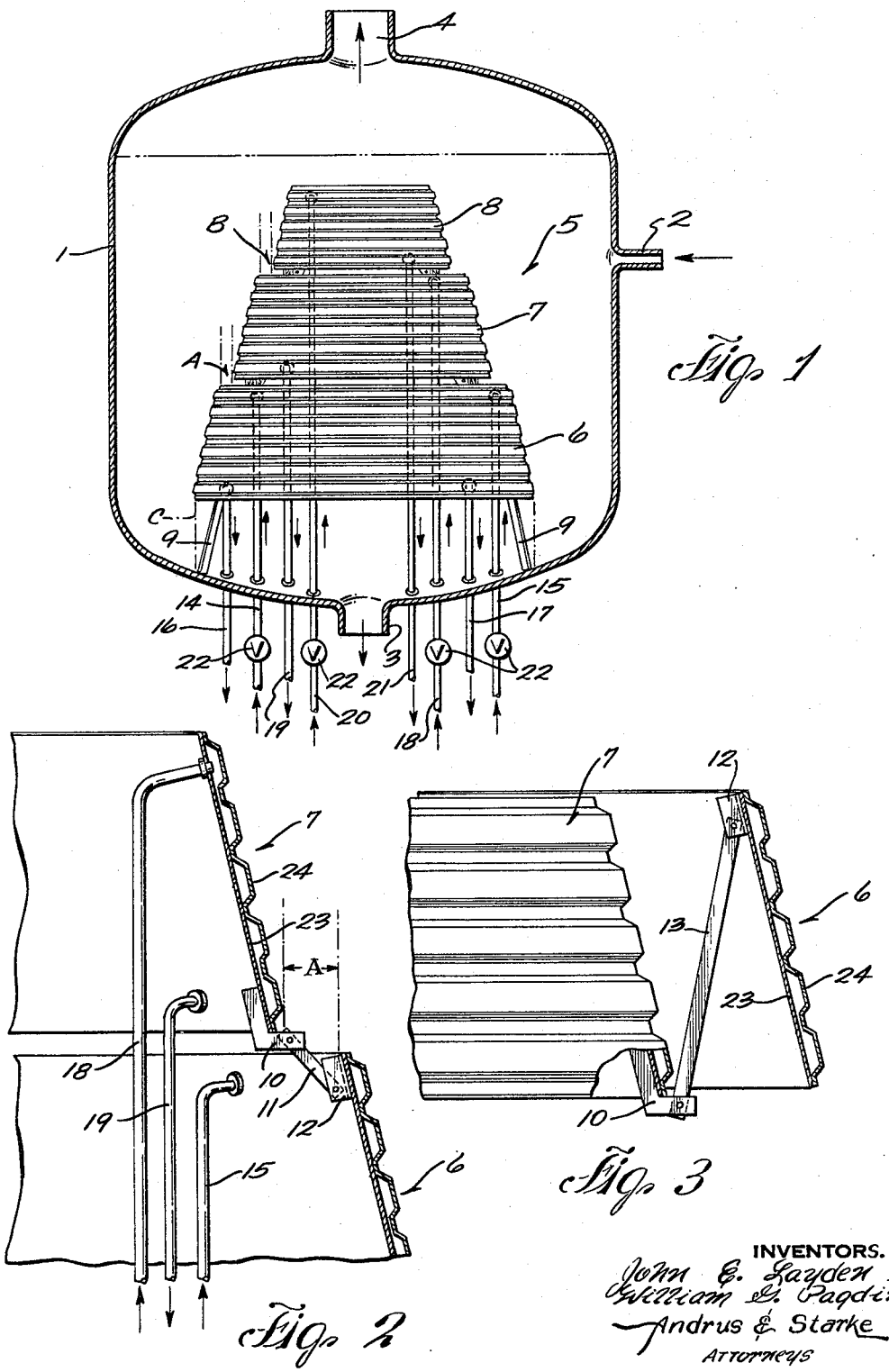

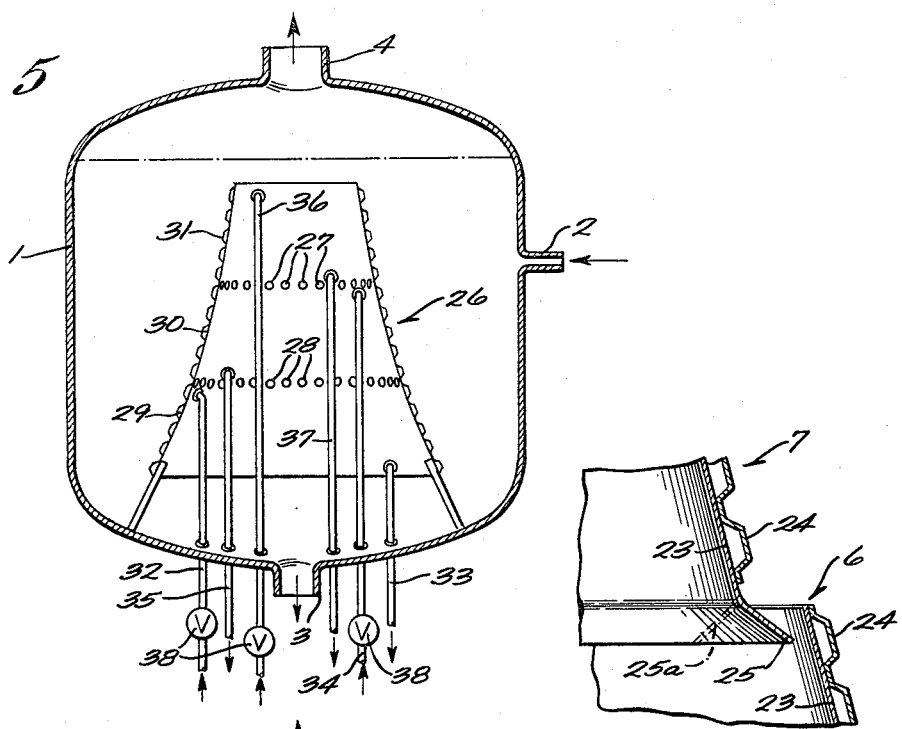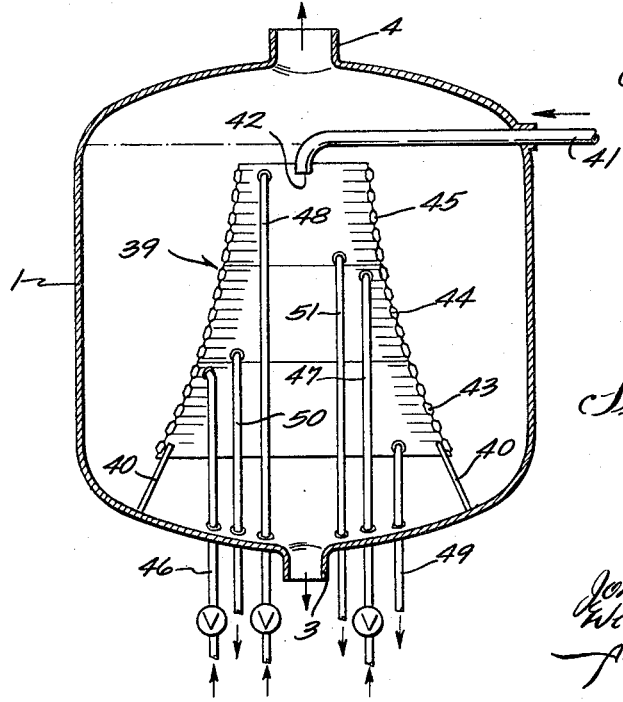

3,384,163
HEATING UNIT FOR A BREW KETTLE
William G. Pagdin and John E. Layden III, Milwaukee, Wis., assignors to Jos. Schlitz Brewing Co., Milwaukee, Wis., a corporation of Wisconsin
Filed Sept. 23, 1966, Ser. No. 581,477
12 Claims. (Cl. 165—108)

ABSTRACT OF THE DISCLOSURE

The invention relates to a heating unit for a brew kettle which provides improved circulation of the wort and produces independently controlled evaporation and violence of boil. The heating unit comprises a series of tapered, vertically disposed heating sections which are located concentrically of the axis of the kettle. The upper end of each section has a greater cross sectional area than the lower end of the next succeeding upper heating section so that an annular passage is provided between the sections. The wort being heated flows upwardly along the inner surface of each lower section, passes upwardly through the annular passage and then flows along the outer surface of the next upper heating section in the series.

---

This invention relates to a heating unit, and more particularly to a heating unit for use in a brew kettle employed in the brewing of malt beverages.

In the brewing of fermentable malt beverages, such as beer and ale, the wort, which is an aqueous phase containing extracts from malt, and other grains, is heated or brewed in the brew kettle. During the brewing process the wort is continuously circulated or agitated to obtain a uniform distribution of the ingredients and to vaporize certain undesirable substances in the wort. In addition, the kettle brew provides a controlled amount of evaporation of the water, and this is achieved by adjusting the heat input to obtain the desired evaporation rate.

The present invention is directed to a heating unit for a brew kettle which provides an improved uniform circulation of the wort and produces independently controlled evaporation and violence of boil, as well as providing the improved circulation with lower steam supply pressure. According to the invention, the heating unit has a generally parabolic or frusto-conical shape, having a larger diameter at one end than at the other end. In the preferred form of the invention the heating unit comprises a series of individual, annular, heating sections which are spaced vertically and located concentrically of the axis of the brew kettle. The bottom heating section of the series has the largest diameter and each succeeding upper section has a progressively smaller diameter. In addition, the walls of each heating section are tapered so that the walls converge in an upward direction with the angle of taper generally being in the range of 5 to 20° with respect to the vertical. As a further distinctive feature, the diameter of the upper end of each heating section is slightly larger than the diameter of the lower end of the next succeeding upper heating section, thereby providing a vertically extending passage between adjacent heating sections.

Steam or other heating media is supplied to the hollow interior of each heating section, and it is preferred to supply the steam separately to each section so that each heating section can be individually controlled.

As steam is supplied to the heating sections, the wort within the sections is heated and rises. Because of the generally parabolic or conical shape of the heating unit, a nozzle effect is produced which increases the velocity of the wort as it rises within the heating sections. Due to this nozzle effect, the wort being discharged from the upper heating section has a substantial velocity, with the result that the wort boils up or erupts at the upper surface level. The wort then flows radially outward to the walls of the kettle, then downwardly along the walls and then inwardly along the bottom of the kettle to the heating unit where it is again heated and circulates upwardly. This improved circulating action produced by the heating unit of the invention produces better heat transfer to the wort as well as improving the distribution of the various constitutents within the wort.

The inverted frusto-conical heating unit of the invention also produces an additional circulatory action which further improves the heat transfer to the wort. The wort which is along with the inner surface of the lower heating section will be heated to a higher temperature than the wort located further away from the heating surface of the lower section and will rise upwardly with a relatively high velocity through the vertical passage between the sections, thereby passing along the outside surface of the next upper section. In addition, the outer surfaces of the sections are preferably formed with a series of horizontal ribs or corrugations, and the combination of the high velocity flow and the corrugated surface reduces the static film on the outer surface of the sections and thereby aids in the heat transfer to the wort.

As each of the concentric heating sections is heated individually, evaporation can be conveniently controlled to any desired degree by individual adjustment of the supply of heating medium to the various heating sections.

As a further advantage, steam can be supplied to each heating section when that section is submerged in the wort as the vessel or kettle is being filled. Thus it is not necessary for the wort to reach its final level before the heating unit is operated and this saves a substantial period of time in the overall brewing process.

Under normal processing the heating sections are spaced slightly apart so that the upper edge of one section is spaced slightly beneath the lower edge of the next upper section. However, under certain circumstances the heating sections can be nested, either partially or fully, to provide a more intense heating and provide a greater amount of liquid cover, further reducing surface violence.

Surface eruption or violence of the boil depends on the geometry of the heating unit and its position beneath the liquid level. By using a heating unit which converges upwardly the violence will be increased over natural convection and in most instances this structure is preferred. However, in some cases where it is desired to decrease violence with respect to natural convection. The walls of the heating unit can diverge upwardly.

Other objects and advantages will appear in the course of the following description.

The drawings illustrate the best mode presently contemplated of carrying out the invention.

In the drawings:

FIGURE 1 is a vertical section of a typical brew kettle employing the heating unit of the invention;

FIG. 2 is a transverse section taken along line 2—2 of FIG. 1;

FIG. 3 is a fragmentary vertical section showing a pair of heating sections in nested relation;

FIG. 4 is an enlarged fragmentary plan view of a modified form of the heating unit which includes an annular baffle or skirt;

FIG. 5 is a vertical section of a brew kettle utilizing a modified form of the heating unit; and FIG. 6 is a vertical section of a brew kettle employing a second modified form of the heating unit of the invention.

The drawings illustrate a conventional brew kettle 1 for brewing wort. The wort, which is an aqueous mixture of extracts from malt and other grains, is introduced into the kettle through inlet 2 and is withdrawn at the completion of the brewing operation through an outlet 3 formed in the bottom of the kettle. The upper end of the kettle 1 defines a vent stack 4 through which the products of evaporation are vented.

According to the invention, the wort is heated within the kettle 1 by a heating unit 5 which includes a series of hollow annular sections, a lower section 6, a middle section 7 and an upper section 8, all of which are disposed concentrically of the axis of the kettle 1.

To support the heating unit within the kettle, a series of legs 9 are attached to the lower section 6 and are supported on the bottom surface of the kettle 1. The middle section 7 is supported from the lower section by a series of angle brackets 10 which are welded to the inner surface of the section 7 and the lower flange of the angle bracket 7 is connected to the upper end of a brace 11 by bolts or the like. The lower end of the brace 11 is connected to a plate 12 attached to the inner surface of the section 6.

The upper section 8 is supported from the middle section in a similar manner, with the support brackets 10 being connected to the upper section 8 and braces 11 connecting the brackets 10 and plates 12 which are welded to the inner surface of the middle section 7 along its upper edge.

In normal operation, the three heating sections 6, 7 and 8 are located in vertical spaced relation in which the upper edge of each section is spaced vertically from the lower edge of the next upper section. However, in some instances when it is desired to increase the intensity of heating, or concentrate the location of heating, the sections can be nested as shown in FIG. 3. In this situation the braces 11 are replaced by a series of long support arms 13 which are connected between the plates 12 and the angles 10 as shown in FIG. 3. In this manner one or more of the heating sections can be nested within the adjacent sections to provide the desired heating effect.

Steam or other heating medium is introduced to the lower section 6 through a pair of lines 14 and 15 and the condensate is drained from the section 6 through drain lines 16 and 17. Similarly, steam is introduced to the middle section 7 through line 18 and the condensate is drained from section 7 through line 19, and steam is introduced to the upper section 8 through line 20 and the condensate is drained from section 8 through line 21. Valves 22 are located within the steam lines 14, 15, 18 and 20 and serve to control the flow of steam through the respective lines and thereby regulate the heating effect. Valves 22 can be manually operated or can be automatically operated by any conventional control mechanism.

While the drawings show the lower section 6 supported by legs 9 and the upper sections 7 and 8 supported by braces 11, it is contemplated that in some cases the heating sections can be supported solely or partially by the steam piping.

The internal construction of the heating sections is not particularly critical and, as shown in FIG. 3 each of the sections is formed of a generally flat inner wall 23 and a horizontally corrugated outer wall 24 which are joined together to provide a series of horizontal passages. The horizontal passages in each section are joined together at circumferentially spaced locations by vertical supply and return passages so that the steam will flow through the horizontal passages in a straight-through, non-serpentine path. It is preferred that the steam passages extend horizontally to reduce the portion of the internal surface of each passage which is coated with condensate film, and thereby increase the heat transfer.

As best shown in FIG. 1, the heating sections 6, 7 and 8 are tapered or converged in an upward direction so that the upper end of each section has a smaller diameter than the lower end of that section. The angle of taper is preferably in the range of 5 to 20° with respect to the vertical axis of the sections for a liquid having a viscosity comparable to wort and preferably in the range of 8 to 10°. When heating materials of considerably different viscosities, or when different combinations of evaporation and violence are desired, the angularity of the sections can be correspondingly varied.

The lower end of each heating section is spaced above the upper end of the next succeeding lower section and the diameter of the lower end of each section is smaller than the diameter of the upper end of the next lower section. This results in the formation of an annular, vertically extending passage, indicated by A, between the lower section 6 and the middle section 7, and a similar annular vertical passage B between the section 7 and the uppermost section 8.

The diameter of each section is related to the height of that section so that the outer surface area of the larger section 6 is approximately equal to the sum of the surface areas of the sections 7 and 8.

In operation, the wort is heated in the lower section 6 and the heated wort will circulate upwardly through the sections 7 and 8. As the sections are tapered, a nozzle effect is produced which will progressively increase the velocity of the wort as it rises within the sections, with the result that the wort discharged from the upper end of the top section 8 will erupt from the surface of the wort with a violent boiling action. The wort will then flow radially outward, then downwardly along the walls of the kettle and return along the bottom of the kettle to the interior of the lower heating section 6.

During the heating, the wort along the inner surface of the heating section 6 will be heated to a higher temperature than the wort located centrally of the section with the result that the wort along the inner surface of section 6 will move upwardly with a greater velocity than the wort in the interior of section 6. The high velocity wort moving upwardly along the surface of section 6 passes through the vertical passage A and along the outside surface of the middle heating section 7, and the combination of the high velocity flow and the corrugated outer surface 24 produces a wiping action which reduces the film coefficient on the outer surface of section 7 and increases the rate of heat transfer.

The wort located centrally of lower section 6 will rise up into the middle heating section 7, and again the wort moving along the inner surface of section 7 will be heated to a higher temperature and have a greater velocity and will rise upwardly through the passage B. The high velocity wort passing through the passage B will flow along the outer surface of the upper section 8 to thereby reduce the static film condition on this surface and increase the rate of heat transfer from section 8 to the wort. The cooler wort from the central portion of section 7 rises upwardly into contact with the inner surface of upper section 8, and consequently there is a greater differential in temperature between the wort and the heating surface resulting in a greater heat transfer.

The tapered configuration of the three heating sections 6, 7 and 8 provides a nozzle effect, and to vary the degree of violence for a given steam input the angle of taper can be changed with the greater the angle the greater the velocity of the wort being discharged from the upper end of the respective section. For most applications it is preferred to use an inverted frusto-conical heating unit, as shown in FIG. 1, which increases violence over natural convection. However, in some instances where it is desired to decrease violence with respect to natural convection the walls of the heating unit can diverge upwardly.

As steam is individually supplied to each of the three heating sections, the rate of evaporation and violence can be readily controlled by adjusting the flow of steam to the three sections.

The heating unit of the invention provides improved circulation for the wort during the brewing process which results in better heat transfer to the wort as well as maintaining the precipitable protein floc in suspension while retaining the proper particle size of the floc so that it can be readily precipitated later in the brewing process.

The use of a separate heating supply for each of the heating sections is an added advantage in that the steam can be supplied to each heating section when it is submerged in the wort during filling of the kettle. Heat cannot be supplied to the heating sections until the section is completely submerged in wort, otherwise the portion of the wort located in the center of the partially submerged section will be trapped and overheated, resulting in decomposition or camelization on the wort.

By utilizing individual heating for each of the sections, substantial time is saved in the brewing process, for each section can be heated when it is submerged rather than having to wait until the entire heating unit is submerged as in a unit having a single heat supply.

Depending on the viscosity, density and surface tension of the liquid being heated, the shape of the heating unit can be varied, i.e. conical, parabolic, hyperbolic, to give the desired velocity, acceleration and surface violence characteristics to the heated liquid.

As the passages in heating sections 6, 7 and 8, through which the steam is circulated, are relatively small in cross section, the sections can be fabricated from thin stainless steel and the use of stainless steel substantially reduces maintainance costs and increases the life of service of the unit. In the traditional heating unit for a brew kettle, large steam chambers are employed which, due to the pressure involved, require substantial wall thickness. Stainless steel is not satisfactory for these thicker walls because of its relatively low heat transfer characteristics. To obtain the necessary heat transfer in a traditional thick-wall heating chamber, copper-base alloys are normally used. Copper alloys do not, however, have the strength, corrosion resistance or abrasive resistance of stainless steel and therefore require considerably more maintenance.

FIG. 4 illustrates a modified form of the heating unit shown in FIGS. 1–3. In this embodiment, the lower edge 25 of outer plate 24 of section 7, extends downwardly and outwardly into the upper end of the section 6 and forms an annular skirt or baffle. A similar skirt 25 can be formed on the lower edge of upper section 8.

The skirt serves to vary the pattern of violence. If the skirt is in the position shown in the full lines in FIG. 4, it decreases the effective width of passage A and directs more of the liquid upwardly within the unit, resulting in more localized or concentrated violence with a greater height of eruption. If the skirt is in the position 25a, shown by the phantom lines in FIG. 4 more liquid will be directed through passage A, resulting in a more widely distributed violence pattern, and a lesser height of eruption.

FIG. 5 illustrates a modified form of the invention in which the heating unit 26, corresponding to heating unit 5 of the first embodiment, has a generally parabolic shape and is supported from the bottom of the kettle 1 by a series of legs.

A series of holes 27, located in a generally horizontal plane, are formed in the heating unit 26 and a second series of holes 28, also located in a generally horizontal plane, are formed in the wall of the heating unit 26 beneath the holes 27. The portion of the heating unit beneath the holes 28 defines a lower heating section 29, the portion of the heating unit 26 between holes 27 and 28 correspond to a middle heating section 30 and the portion of the heating unit above the holes 27 corresponds to an upper heating section 31.

A single source of steam or other heating medium can be supplied to the entire heating unit 26 or, as shown in the drawings, each of the sections 29, 30 and 31 can be individually heated. In this regard, steam is introduced through line 32 to the lower heating section 29 and the condensate is withdrawn through line 33. In addition, steam is supplied to the middle section 30 through line 34 and the condensate is withdrawn through line 35. In a similar manner, steam is supplied through line 36 to the upper heating section 31 and the condensate is withdrawn through line 37. Valves 38, similar to valves 22, are located in the steam lines to control the flow of steam to the various sections.

The specific structure of the heating unit 26 is not critical and can be formed with corrugated walls similar to that of the heating unit 5. If, as shown in the drawings, the heating unit 26 is divided into three separate heating sections 29, 30 and 31, the passages within the walls of each of the individual sections will not communicate with the passages in the other sections.

In operation, the heating unit 26 functions in a manner similar to that of the first embodiment. The wort within the lower portion of the heating unit 26 will be heated and will rise upwardly. The parabolic configuration of the heating unit provides a nozzle effect to increase the velocity of the wort as it moves upwardly.

The portion of the wort located along the inner surface of the lower heating section 29 will be heated to a higher temperature and have a greater velocity than the wort in the central portion of section 29, and the high velocity wort will rise upwardly through the openings 28 and along the outer surface of the central section 30 and the combination of the increased velocity and the corrugated surface serves to reduce the film coefficient and increase the heat transfer. Similarly, the wort along the inner surface of central heating section 30 will move upwardly through the openings 27 and pass along the outer surface of the upper section 31 of the parabolic heating unit to reduce the film coefficient of that portion and increase the rate of heat transfer to the wort.

The wort being discharged from the upper end of the parabolic heating unit 26, as well as the wort which traveled upwardly through the openings 27 and 28 will erupt from the surface to provide the desired violence for evaporation. The wort will then flow radially outward, then downwardly along the walls of the kettle back and return to the lower end of the heating unit 26 to provide the desired circulation. The degree of taper or curvature of the heating unit 26 as well as its position beneath the liquid level will determine the surface eruption and violence pattern.

With the use of a separate heating supply for each of the heating sections 29, 30 and 31, steam or other heating fluid can be supplied individually as each section is submerged when the kettle is being filled with wort. For example, when the level of wort reaches the series of openings 28, heat can be supplied to the lower section 29 without danger of forming a trapped pocket of overheated wort, for the wort within the lower section 29 can circulate upwardly through the openings 28.

FIG. 6 illustrates a second modified form of the heating unit in which the heating unit 39 has a generally parabolic shape, and is supported from the bottom of the kettle 1 by a series of legs 40. In this embodiment the wort, during filling of the kettle, is introduced into the upper end of the heating unit 39 through an inlet pipe 41 which extends through the side wall of the kettle and the inner end 42 of inlet pipe 41 is bent downwardly and is located in direct alignment with the upper end of the heating unit 39.

The heating unit 39 is divided into a series of vertical heating sections 43, 44 and 45 and individual steam lines 46, 47 and 48 and condensate lines 49, 50 and 51 are connected to each heating section as previously described with respect to the first two embodiments.

By introducing the wort into the upper end of the parabolic heating unit during filling, the wort will flow downwardly and be discharged from the lower end of the heating unit, thereby permitting the heating medium to be separately supplied to each heating section before the heating unit is completely submerged without the danger of forming a trapped pocket of overheated wort in the interior of the heating unit.

During the brewing process, the heated wort rises upwardly within the heating unit, and due to the parabolic shape of the unit, a nozzle effect is created which increases the velocity of the wort so that the wort will boil or erupt from the surface to provide the desired violence for evaporation. As in the case of the previous embodiments the wort then flows radially outward, then downwardly along the side walls of the kettle and returns along the bottom of the kettle to the lower end of the heating unit.

By employing separate heating for each of the sections 43, 44 and 45 in the parabolic heating unit, the heating effect can be conveniently regulated to obtain the desired violence for controlled evaporation, as well as permitting each section to be individually heated when that section is submerged on filling of the kettle, thereby substantially reducing the overall time for the brewing process.

The specific shape of the heating unit 5, 26 or 39 can be varied depending on the viscosity, density and surface tension of the liquid being heated to provide the desired velocity, and violence pattern. It has been determined that during the initial heating period, before boiling and when there are no significant gas bubbles present, the optimum shape of the heating unit, based upon the assumption of constant acceleration, would follow the formula:

$$r^2(k_1y - k_2) = 1$$

where $r$ is the radius of the heating unit or the $x$ dimension for any value of $y$ and $k_1$ and $k_2$ are arbitrary constants.

During boiling the theoretical shape of the heating unit, again based on the assumption of constant acceleration, can be determined from the formula:

$$r(y - d) = k$$

where $r$ is the radius of the heating unit or the $x$ dimension for any value of $y$, $k$ is an arbitrary constant and $d$ is the distance from the bottom of the heating unit to the surface of the liquid.

There are practical factors, however, which cause the shape of the heating unit to vary from the theoretical. First, there is a variation in velocity of the liquid through any given cross section of the heating unit which depends on the viscosity and other characteristics of the liquid being heated. Secondly, as the theoretical shape approaches a straight line function, a frusto-conical shape, as shown in FIG. 1, is generally employed because straight walls are much easier to fabricate than curved walls which would be required, for example, with a parabolic or hyperbolic configuration.

Various modes of carrying out the invention are contemplated as being within the scope of the following claims particularly pointing out and distinctly claiming the subject matter which is regarded as the invention.

We claim:

1. In an apparatus for heating a liquid, a kettle to contain the liquid, an annular hollow heating unit spaced from the bottom of the kettle and located substantially concentrically with respect to the vertical axis of the kettle, said heating unit comprising a pair of separate substantially vertically spaced and coaxially disposed annular heating sections with each heating section tapering upwardly and the upper end of the lower heating section having a greater cross sectional area than the lower end of the upper heating section to provide an annular passage therebetween whereby liquid passing upwardly along the inner surface of the lower section will flow through said annular passage and pass upwardly along the outer surface of said upper section, means for supporting each heating section in the kettle, and heat supply means for supplying a heating medium to the interior of each heating section.

2. The apparatus of claim 1, wherein said heating sections are circular in cross section and the lower end of the upper heating section is spaced vertically above the upper end of the lower heating section.

3. The apparatus of claim 1, wherein the inner surface of each heating section is generally smooth and the outer surface of each heating section is provided with a series of surface deviations to increase the turbulence of flow of the liquid passing over said outer surface.

4. The apparatus of claim 3, wherein said surface deviations are generally horizontal corrugations.

5. The apparatus of claim 1, wherein each section includes a series of separate generally horizontal internal passages, a generally vertical inlet passage providing communication between said heat supply means and an end of each of said horizontal passages, and a generally vertical outlet passage connected to the opposite end of each horizontal passage for withdrawing said heating medium from said sections.

6. The apparatus of claim 1, in which the heating sections are tapered at an angle of 5 to 20° with respect to the vertical axis of said heating unit.

7. The apparatus of claim 1, and including means for adjusting the relative vertical position of said heating sections to thereby vary the intensity of heating.

8. The apparatus of claim 1, in which the heating unit comprises three vertically spaced heating sections and the outer surface area of the lowermost heating section of the series is substantially equal to the sum of the outer surface areas of the upper two heating sections.

9. The apparatus of claim 1, in which the heating sections are mounted for movement between a nested position in which the heating sections are nested within the lower heating section to a stacked position in which the heating sections are in vertically spaced relation.

10. The apparatus of claim 1, and including an annular skirt extending generally downward from the lower end of at least one of said sections and terminating beneath the level of the upper edge of the next succeeding lower section and in radial spaced relation to the said next succeeding lower section to provide an annular passage therebetween.

11. The apparatus of claim 10, in which said skirt diverges downwardly.

12. An apparatus for heating a liquid, a kettle to contain the liquid, a hollow annular heat transfer unit located within the kettle and spaced from the bottom of the kettle, the axis of the unit being generally vertical and said unit being generally parabolic in shape, liquid supply means connected to a source of liquid to be heated and extending through the wall of the kettle, said liquid supply means having a liquid outlet located adjacent the upper end of the heating unit and disposed to discharge liquid downwardly into the interior of said heating unit, and heat supply means connected to the interior of the unit for supplying a heating medium to said unit.

References Cited

UNITED STATES PATENTS

| 953,607   | 3/1910 | Grandtzdorffer | 165—108 |
| 1,198,536 | 9/1916 | Green          | 165—108 |
| 2,166,027 | 7/1939 | Tay            | 165—108 |
| 2,926,002 | 2/1960 | Spielvogel     | 165—109 X |

FOREIGN PATENTS

| 1,339,751 | 9/1963 | France. |
| 677,579   | 8/1952 | Great Britain. |

ROBERT A. O'LEARY, *Primary Examiner.*

A. W. DAVIS, JR., *Assistant Examiner.*